(12) United States Patent
Winters et al.

(10) Patent No.: US 6,505,053 B1
(45) Date of Patent: Jan. 7, 2003

(54) METHOD FOR SINUSOIDAL MODELING AND PREDICTION OF FAST FADING PROCESSES

(75) Inventors: Jack Harriman Winters, Middletown, NJ (US); Jeng-Kuang Hwang, Chung-Li (TW)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/469,609

(22) Filed: Dec. 22, 1999

Related U.S. Application Data

(60) Provisional application No. 60/163,571, filed on Nov. 5, 1999.

(51) Int. Cl.$^7$ .................................................. H04B 7/02

(52) U.S. Cl. ..................... 455/504; 455/278.1; 455/506; 342/383; 375/267; 375/349

(58) Field of Search ................................ 455/504, 506, 455/272, 273, 278.1, 137; 375/349, 350, 267; 342/380, 383

(56) References Cited

U.S. PATENT DOCUMENTS

| | | | |
|---|---|---|---|
| 4,173,759 A | * 11/1979 | Bakhru | 343/100 |
| 4,661,993 A | 4/1987 | Leland et al. | 455/103 |
| 4,939,791 A | * 7/1990 | Bochmann et al. | 455/137 |
| 5,262,789 A | 11/1993 | Silverstein | 342/368 |
| 5,581,580 A | 12/1996 | Lindbom et al. | 375/340 |
| 5,890,068 A | 3/1999 | Fattouche et al. | 455/456 |

OTHER PUBLICATIONS

Winters, Jack H., "Signal Acquisitions and Tracking with Adaptive Arrays in the Digital Mobile Radio System IS–54 with Flat Fading", *IEEE Transactions on Vehicular Technology*, vol. 42, No. 4, pp. 374–384 Nov. 1993.

Dumont, L. et al., "Super–resolution of multipath channels in a spread spectrum location system", *IEE* 1994, Jul. 25, 1994.

Wang, Hong Shen et al., "Finite–State Markov Channel–A Useful Model for Radio Communication Channels", *IEEE Transactions on Vehicular Technology*, vol. 44, No. 1, pp. 163–171, Feb. 1995.

Wang, Hong Shen et al., "On Verifying the First–Order Markovian Assumption for a Rayleigh Fading Channel Model", *IEEE Transactions on Vehicular Technology*, vol. 45, No. 2, pp. 353–357, May 1996.

Cupo, Robert L. et al., "Adaptive Antenna Applique Field Test", presented at Smart Antenna Workshop, 1997.

Klukas, Richard et al., "Cellular Telephone Positioning Using GPS Time Synchronization", *GPS World Magazine*, Apr. 1998.

Wu, Wei–Chiang, et al., "Root–MUSIC Based Joint Identification and Timing Estimation of Asynchronous CDMA System over Rayleigh Fading Channel", *IEICE Trans. Fundamentals*, vol. E81–A, No. 8, pp. 1550–1559, Aug. 1998.

Giannakis, Georgios B. et al., "Basic Expansion Models and Diversity Techniques for Blind Identification and Equalization of Time–Varying Channels", *Proceedings of the IEEE*, vol. 86, No. 10, pp. 1969–1986, Oct. 1998.

* cited by examiner

*Primary Examiner*—Lee Nguyen

(57) ABSTRACT

The present invention discloses a method for predicting fast fading using sinusoidal modeling techniques. The method first applies a finite impulse response low pass filter to the incoming signal thus increasing the fading power to noise ratio. Applying a root-MUSIC frequency estimation model, a sinusoidal model for the fading process is obtained. This model can be used to enhance the performance of spatial diversity schemes or temporal processing schemes to reduce the effect of the fading.

23 Claims, 4 Drawing Sheets

METHOD FOR SINUSOIDAL MODELING AND PREDICTION OF FAST FADING PROCESSES

This application claims the benefit of and incorporates by reference herein U.S. Provisional Application No. 60/163,571, entitled "Method for Sinusoidal Modeling and Prediction of Fast Fading Processes", filed Nov. 5, 1999.

FIELD OF THE INVENTION

The present invention is directed to a method for predicting the multipath fading that degrades performance in wireless networks in order to correct for it.

BACKGROUND OF THE INVENTION

It is well known that a principal detrimental factor limiting the performance of wireless communication systems is signal fading, in that it is unknown and imposes multiplicative distortion on the transmitted signal. An effective technique to tackle this difficulty is spatial diversity which uses multiple receiving antennas and employs a certain scheme to combine the multiple independently-faded received signals. However, for such a scheme to be successful, it is often necessary to estimate or track the fading process to determine the appropriate combiner weights to be applied to the signal from each antenna during the combining process. Under slow fading conditions, the fading estimation is often done using a windowing and averaging technique. However, because the fading rate is proportional to the carrier frequency and the speed at which the mobile wireless unit is moving, the variances in the fading become faster as the carrier frequency and/or mobile unit speed is increased. For such a fast varying fading channel, the conventional averaging method needs to use a shorter window length, resulting in degraded performance.

The problem of fading prediction has been studied previously and other researchers have assumed that the fading process could be modeled by a small number of time varying sinusoids. (G. Giannakis, C. Tepedelenlioglu, Basis Expansion Models and Diversity Techniques for Blind Identification and Equalization of Time-Varying Channels, Proceedings of the IEEE, October 1998). In investigating the statistical properties of fading, researchers often began with a model of multiple superimposed sinusoids which correspond to many reflected rays with different Doppler frequency offsets, attenuations, and phases. This physical conception leads to a sinusoidal model with its parameters regarded as random variables. Based on this idea, Jakes proposed a widely adopted Rayleigh fading model to generate artificial fading process for system simulations. (C. Jakes, Microwave Mobile Communications, IEEE Press Reprint, 1974). In fact, spectral analysis of real-world fading data strongly supports the conjecture that the complex baseband fading process often mainly consists of a small number of time varying sinusoids.

Markov-type models have also long been used for studying the statistical properties of fading processes, such as level crossing rate, etc. For such a model to be applied to fading prediction, it is rational to consider the Kalman filtering techniques. (H. Meyr, Digital Communication Receivers, John Wiley 1998). However, since the whole state-space signal model entails an unpredictable process noise and a measurement noise, it is feasible to predict only a very few steps ahead. Furthermore, this model has no direct link to the physical origin that gives rise to the fading phenomenon which makes it inappropriate for fading prediction.

SUMMARY OF THE INVENTION

In modeling the fading as a superimposed sinusoidal process, the present invention assumes that the sinusoidal parameters can be treated as unknown constants during a short enough interval. Thus, the fading process may be viewed as a deterministic sinusoidal process with time-varying parameters. Using the method of the present invention these time-varying parameters can be determined and used to predict the fading process. If a receiver is equipped with the capability of predicting the fading process using the method of the present invention, then significant performance improvement may be possible.

The present invention assumes that, during a relatively short interval, the parameters of a sinusoidal model are constants and if those constants can be calculated then the model can predict fading behavior and be used to compensate for it at least a short time period before and after the time frame of the data that was used to construct the model. The present invention teaches a method of determining the parameters for a sinusoidal model of the multipath fading of a wireless system based on the behavior of the received signal and then using those parameters to predict fading behavior.

The present invention accomplishes this by first obtaining the noisy fading data from the discrete time sampled received signal. This can be accomplished by decoding the symbols from the received signal and removing the modulation of the signal using the decoded symbols, through the use of pilot symbols that are already known to the receiver and hence would not have to be decoded and could simply be demodulated, or other known techniques. The resulting record of noisy fading data is then low pass filtered based on known values for the carrier frequency and maximum Doppler shift in order to improve the fading power to noise ratio. The filtered fading data is then processed using the root-MUSIC algorithm in order to obtain frequency estimates for the superimposed sinusoids, and a linear least square fit is performed to obtain an amplitude and phase for each sinusoid. Once these values have been obtained, they are used to construct the sinusoidal model which can then be used to compensate for the fading behavior in incoming signals resulting in improved receiver performance.

The present invention also teaches that the model can be improved by setting a constraint on the frequency estimates based on the maximum Doppler frequency and improving the least square fit by a control point constraint based on critical data points in the filtered fading data including boundary points, level crossing points, and/or peak points.

DETAILED DESCRIPTION

Figure 1:
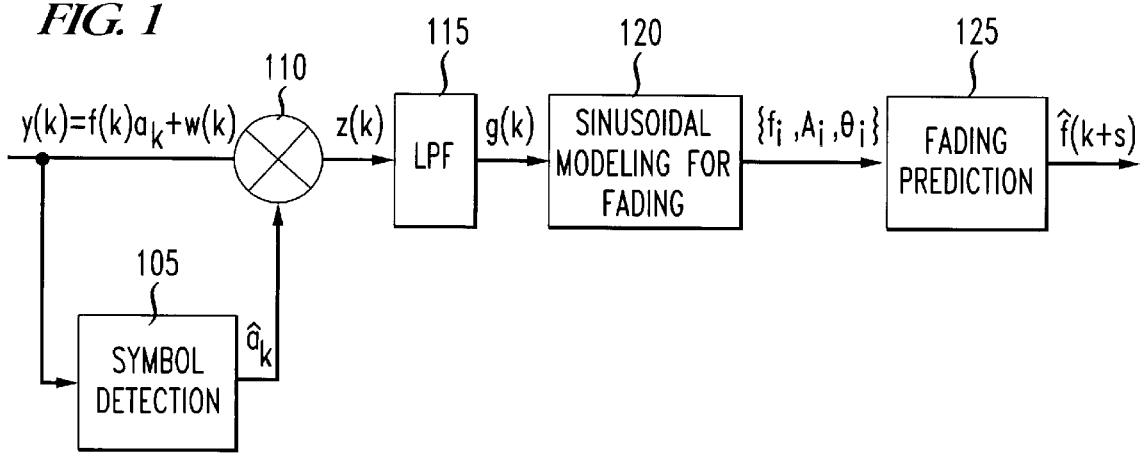
FIG. 1 illustrates an overview of one possible implementation of the method of the present invention.

The present invention will allow improved performance in wireless mobile communication networks by improving the ability of the system to correct for fading behavior. The present invention extracts the fading data from the signal by stripping out the data symbols and filtering out the high frequency noise. This filtered data is then processed using the root MUSIC algorithm and a least squares fit to obtain the parameters for multiple superimposed sinusoids which model the fading behavior. This model can then be used in a variety of ways to correct for fading effects on the received signals. One of the ways that the model can be used is to calculate combiner weights to be applied to the multiple received signals in a spatial diversity scheme. The model could also be used to calculate the delay values for use in linear or feedback equalizers employed in a temporal processing scheme. Additionally, the model could be used to correct the fading effect on previously received signals where the fading behavior was so severe that the symbols could not be decoded. For example, if a "bad" segment of data was received, the "good" segments before or after the "bad" segment could be used by the present invention to construct the model and the resulting model could be used to compensate for the fading behavior on the "bad" segment thus allowing it to be interpreted.

The theoretical/mathematical basis of the construction of the sinusoidal model is as follows.

Consider a complex baseband signal $$x(t) = \sum_k a_k p(t - kT) \tag{1}$$

where $\alpha_k$ is the transmitted symbol with $|\alpha_k|=1$, and p(t) is the baseband shaping. If x(t) is passing through a flat fading channel, the complex envelope of the received signal can then be written as $$y(t)=f(t)x(t)+w(t) \tag{2}$$

where f(t) is the multiplicative fading process of interest, and w(t) is additive white Gaussian noise. Assuming that the complex fading process consists of multiple complex sinusoids as $$f(t) = \sum_{i=1}^{P} A_i e^{j(2\pi f_i t + \theta_i)} \tag{3}$$

which can be interpreted as P incident rays with different path attenuations $A_i$, Doppler shifts $f_i$ and phase shifts $\theta_i$, i=1, ..., P. In addition, the maximum possible Doppler shift (fading rate) can be assumed known, since it is given by $$f_{D\,max}=f_{cmax}v/c (Hz) \tag{4}$$

where $f_c$ is the carrier frequency, $v_{max}$ is the maximum vehicle speed, and c is the speed of light. For example, with $f_c$=1.9 GHz and $v_{max}$=60 mph, $f_{Dmax}$ is set to about 180 Hz.

Assuming that the symbol rate is much greater than the fading rate and the overall pulse shaping satisfies the zero ISI condition at the symbol sampling points, after receive filtering and sampling at the symbol rate R=1/T, the resulting discrete-time samples are given by $$y(t)|_{t=kT}=y(k)=f(k)\alpha_k+w(k) \tag{5}$$

Assuming that the receiver has correctly detected the symbol $\alpha_k$, by multiplying the received sample y(k) by $\hat{\alpha}_k^*=\alpha_k^*$, the modulation can be removed, yielding $$z(k)=y(k)\hat{\alpha}_k^*=f(k)+w'(k) \quad k=0, 1, 2, \ldots, N \tag{6}$$

where w' (k) is still an additive white Gaussian noise with the same variance as w(k). The sinusoidal frequencies for the discrete-time data are normalized with respect to the symbol rate (sampling frequency), and denoted by $\bar{f}_i=f_i/R=f_iT$.

With such a record of noisy fading data, the problem can be stated as follows: Given the data record {z(k), k=0, ..., N} and maximum Doppler frequency $f_{Dmax}$, 1. Estimate the parameters $\{A_i, \bar{f}_i, \theta_i\}$ in the flat fading model.
2. Predict the fading process f(k) for k=N+1, ..., N+L.

Since the normalized maximum frequency component of the discrete-time sample f(k) is no more than $f_{Dmax}T$, the out-of-band noise in z(k) can be filtered. This leads to an increase in fading power-to-noise ratio (FNR). In fact, the conventional averaging method can be regarded as a low-pass filter (LPF) with an impulse response of a rectangular window. It has been shown that the selection of window length and window type has an influence on the overall performance. The present invention uses the formal filter design technique for low pass pre-filtering. First, the LPF should be linear phase since it is to pass f(k) without distortion. Thus a finite impulse response (FIR) filter is used rather than an infinite impulse response (IIR) filter. Then, among the various FIR filters, the Parks-McClellan optimal equiripple filter is used which satisfies the following specifications:

Passband edge: $f_{Dmax}T$

Stopband edge: $f_{Dmax}T+f_{TB}$ ($f_{TB}$ is the width of transition band)

Maximum passband ripple: $\rho$ dB (should be small)

Minimum stopband attenuation: D dB

The transfer function of this filter can be written as $$B(z) = \sum_{i=0}^{L} b(i)z^{-i} \tag{7}$$

Suppose that an ideal LPF is used. Then the improvement factor in FNR by using the ideal LPF is 10 log (R/$f_{Dmax}$). For a practical FIR LPF, the improvement factor is about 10 dB, mainly depending on the filter order L.

When applying the LPF to the data record, two things should be noted. First, the output noise component v(k) becomes a colored moving average (MA) noise with known autocorrelation function:

$$R_v(l) = \sigma_w^2 \sum_{i=0}^{L-l} b(i)b(i+l) \text{ for } |l| < L \text{ and zero elsewhere} \tag{8}$$

that is assumed known. Second, there exists a group delay (misalignment) of L/2 between the true fading process f(k) and the LPF output g(k). Without time shifting, this can lead to a combiner weight bias (and can therefore degrade the BER (Bit Error Rate) performance of the mobile communication system using those weights), especially in fast fading situations.

The present problem is similar to the harmonic retrieval problem that has been extensively discussed over the past 20 years. There are numerous existing methods to solve this problem. Basically, they can be classified into two categories: fast Fourier transform (FFT) based methods and model-based high-resolution methods. Since the fading rate is much less than the symbol rate, the frequencies of the component sinusoids are closely spaced around zero. Thus the high resolution methods are appropriate for this purpose. The root-MUSIC method matches these needs and is computationally moderate.

As a variant of the well-known MUSIC (MUltiple SIgnal Classification) method, root-MUSIC does not do spectral peak finding. First, a K-by-K sample correlation matrix is calculated as $$R = G^* G^H \tag{9}$$

where G is the forward-backward data matrix constructed from the LPF output data g(k).

Assuming that the number of sinusoids is P (P<K−1), then the noise subspace is obtained as $$\text{span}\{V_n\}, \; V_n = [V_{P+1} V_{P+2} \ldots V_K] \tag{10}$$

where $V_n$ consists of the K-P smallest eigenvectors of R. Let $Q = V_n V_n^H$ and $$c_i = \sum_{k=1}^{K-i} Q_{k,k+i} \text{ and } c_{-i} = \sum_{k=1}^{K-i} Q_{k+i,k} \text{ for } i = 0, 1, 2, \ldots, K-1 \tag{11}$$

Noting that $c_i^* = c_{-i}$ results in the polynomial equation $$c_{-K+1} + c_{-K+2} z^{-1} + \ldots + c_0 z^{-K+1} + c_1 z^{-K} + \ldots + c_{K-1} z^{-2(K-1)} = 0 \tag{12}$$

Solving this equation gives 2(K−1) roots having reciprocal symmetry with respect to the unit circle. Denote the P roots that are outside and also nearest to the unit circle as $Z_i, \ldots, Z_P$. Then the frequency estimates for $\bar{f}_i$ (normalized with respect to R) are given by $$\hat{f}_i = \arg(Z_i)/2\pi \; i=1, 2, \ldots, P \tag{13}$$

where $\arg(Z_i)$ denotes the principal argument (in radians) of $Z_i$. It should be pointed out here that the method needs to know the number of sinusoids (P) a priori. However, as explained below, a root location constraint can be used to avoid this problem.

Once the frequency estimates have been obtained, the complex amplitudes (including the phase shift $\theta_i$ and path attenuation $A_i$ for each sinusoid) $E_i = A_i e^{j\theta_i}$ can be found by a linear least-square (LS) fit of the following matrix-vector equation $$A E = [a_1 a_2 \ldots a_P] E = g \tag{14}$$

where $a_i = [1 e^{j2\pi \hat{f}_i} \ldots e^{j2\pi \hat{f}_i N}]^T$ for i=1, ..., P, $E = [E_1 \ldots E_P]^T$ is the complex amplitude vector to be found, and $g = [g(0) g(1) \ldots g(N)]^T$. The LS solution of (14) is given by $\hat{E} = A^\# g$, where $A^\# = (A^H A)^{-1} A^H$ is the pseudo inverse of A.

However, the parameter estimation or model fitting suffers from error due to the presence of noise, and is nonstationary due to the time-varying sinusoidal parameters with real-world fading.

Let the predicted (extrapolated) fading process be denoted by $\hat{f}(k)$ for k>N. When the true fading f(k) is known, as in the computer simulation case, then the fading prediction error is $$e(k) = f(k) - \hat{f}(k) \; k > N \tag{15}$$

On the other hand, for the real-world measured data case, the true fading is not known exactly. Thus using the LP filtered fading process g(k) instead of f(k), the prediction error is defined as $$e_r(k) = g(k) - \hat{f}(k) \; k > N \tag{16}$$

Now, for the computer simulation case, assume there are M independent (Monte-Carlo) experiments under the same fading conditions, and denote the error for the i-th experiment as $e_i(k)$. The normalized mean square error (NMSE) is used as a performance measure, i.e.

$$NMSE_f(k) = \frac{\frac{1}{M}\sum_{i=1}^{M} |e_i(k)|^2}{\frac{1}{MN}\sum_i \sum_n |f(n)|^2} \; k > N \tag{17}$$

where the denominator represents the average power of the simulated fading process.

Since the complex fading process can be divided into an envelope (amplitude) fading process and a phase fading process, a performance measure for the fading envelope can be similarly defined as $$NRMSE_E(K) = \frac{\sqrt{\frac{1}{M}\sum_{i=1}^{M} (|f_i(k)| - |\hat{f}_i(k)|)^2}}{\sqrt{\frac{1}{MN}\sum_i \sum_n |f(n)|^2}} \tag{18}$$

and for the fading phase as $$RMSE_P(k) = \sqrt{\frac{1}{M}\sum_{i=1}^{M} m_p(\angle f_i(k) - \angle \hat{f}_i(k))^2} \tag{19}$$

where $\angle f_i(k)$ denotes the phase of $f_i(k)$, and is in the range of −180° to 180°. In (19), $m_p(\theta)$ is a phase correction function used for subtracting or adding 360° when the phase error is larger than 180° or less than 180°, respectively. That is $$m_p(\theta) = \begin{cases} \theta + 360° & \text{if } \theta < -180° \\ \theta - 360° & \text{if } \theta < +180° \\ \theta & \text{otherwise} \end{cases} \tag{20}$$

The prediction performance as thus far described is quite sensitive to estimation error. Consider the case of a single complex sinusoid as follows $$f(k) = A_i e^{j(2\pi \bar{f}_i k + \theta_i)} = A_i e^{j\theta_i} e^{j2\pi \bar{f}_i k} = E_i e^{j2\pi \bar{f}_i k} \tag{21}$$

Note that f(k) is linear in the complex amplitude $E_i$, but is nonlinear in the frequency $\bar{f}_1$.

Therefore $$\left|\frac{\partial f(k)}{\partial \bar{f}_i}\right| = 2\pi k |f(k)| \text{ or } \left|\frac{\partial f(k)}{f(k)}\right| = 2\pi k |\partial \bar{f}_i| \tag{22}$$

Thus a small error in the frequency estimate can result in an unbounded change in f(k) with time. This is also true for the multiple sinusoids case. Thus, fading prediction performance is quite sensitive to frequency error, becoming less accurate for longer prediction.

Because of the above problem, the present invention includes the following modifications of the root-MUSIC method to enhance its performance for fading prediction.

Root Location Constraint

Since the fading process can be described as a very narrowband LP process consisting of multiple sinusoids, the frequencies of these sinusoids will be closely clustered in the neighborhood of 0 Hz. Furthermore, the maximal possible sinusoidal frequency can be set to the maximum Doppler frequency, $f_{Dmax}$. The above a priori information corresponds to a constraint on the permissible location of the candidate roots obtained by root-MUSIC. More specifically, denote the roots that are outside the unit circle as $Z_1, \ldots Z_{K-1}$, then use a root discrimination rule to select the admissible roots as follows:

$$Z_i \text{ is admissible if} \left\{ \frac{|arg(Z_i)|}{2\pi} < f_{D\ max}T = \varepsilon \right\} \text{ AND} \quad (23)$$

$$\{|Z_i| - 1 < \delta\} \text{ for } i = 1, \ldots, K-1$$

where the second condition is used to exclude some spurious roots which are too far from the unit circle. In this way, the number of modeling sinusoids is also obtained from the data.

Control-point Constraint

This constraint ensures that the estimated fading process coincides with the LP filtered fading data at some selected control points. Such points may be boundary points, level crossing points, peak points, etc., depending on the purpose and situation. Since the frequency estimation method is highly nonlinear, this constraint is difficult to embed in the frequency estimation method. However, it can be incorporated into the linear LS fitting eq. (14) as a linear constraint. Formulate this constrained LS problem as follows:

$$\min_E \|AE - g\|^2 \quad (24)$$

$$\text{subject to } CE = d$$

where A is a known matrix constructed from the frequency estimates, and the number of rows of C denotes the number of control points. Assume there are L control points, and denote the indices of control points as $c_1, \ldots c_L$. Then the i-th row of C is equal to the $c_i$-th row of A, and the same rule holds between the two column vectors d and g.

Solving the above problem using the method of Lagrange multipliers, yields the solution as follows:

$$E = (A^H A)^{-1} (A^H g - 0.5 C^H \lambda) \quad (25)$$

where the Lagrange multiplier vector $\lambda = [\lambda_1 \ldots \lambda_L]^T$ is given by $$\lambda = [C(A^H A)^{-1} C^H]^{-1} [2C(A^H A)^{-1} A^H g - 2d]. \quad (26)$$

The prediction performance of the present invention may also potentially be improved through the use of down-sampling. The root-MUSIC method assumes that the additive noise is white Gaussian; however, this assumption does not hold true for the noise after the input data has been low pass filtered. Down-sampling the fading data can reduce this effect.

The end result of these calculations is the necessary components to construct the sinusoidal fading model, namely: the number of sinusoids, and the frequency, path attenuation, and phase shift for each sinusoid.

Using a fading model determined by the above method, fading prediction can be done.

The overall concept for fading modeling/prediction is illustrated in FIG. 1. FIG. 1 illustrates how the modulated input signal is received and processed by the method of the present invention. First, data symbols are detected in the input signal (105) and used to remove the modulation from the input signal (110), as more fully explained in FIG. 2.

After the signal has been demodulated, only the fading data and a noise component remain. This noisy fading data may then be filtered using a low pass filter, as explained in FIG. 3, in order to reduce the effect of the noise on the calculations required to construct the sinusoidal model (115). After filtering, the data is analyzed using the root-MUSIC algorithm in order to determine the parameters for the sinusoidal model of the fading behavior (120), as detailed in FIG. 4. Following the construction of the model, the model parameters can be used to predict fading behavior and compensate for it (125), as described by FIG. 5.

Figure 2:
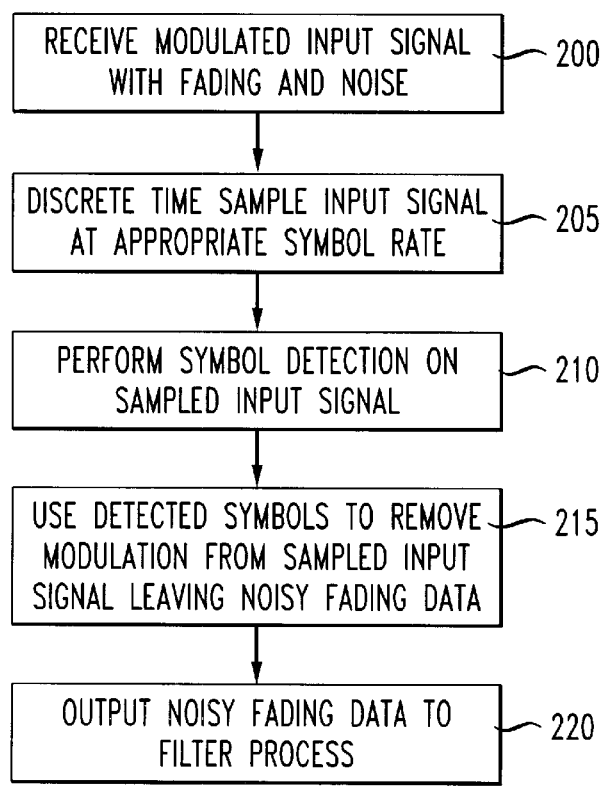
FIG. 2 is a flowchart illustrating one possible implementation of receiving the faded input signal and preparing it for analysis in the present invention.

As shown in FIG. 2, when the modulated signal with fading and noise is received (200), the signal may be discrete time sampled at an appropriate symbol rate (205). Symbol detection is then performed on the sampled input signal (210). The detected symbol data is used to remove the modulation from the sampled input signal leaving just the fading data and noise (215). The noisy fading data is output to the filtering process (220). Alternative methods of extracting the fading data from the input signal may also be employed. For example, known symbols could be sent from the mobile unit to the receiver and these pilot symbols could be demodulated from the signal without requiring that the receiver first decode the symbols. This could be especially useful if the fading behavior's effect on the signal is so severe as to make decoding the symbols difficult without first compensating for the fading effect.

Figure 3:
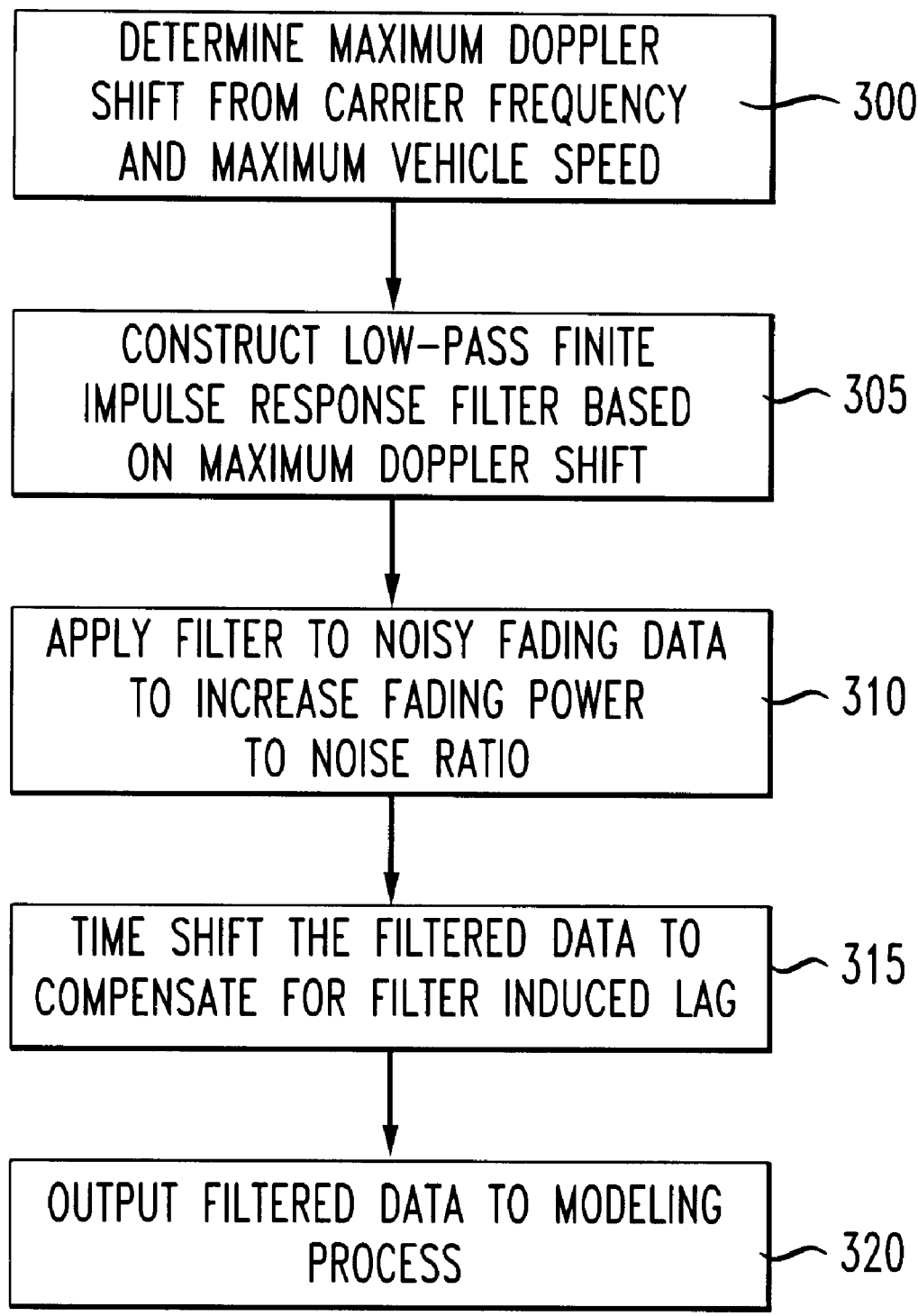
FIG. 3 is a flowchart illustrating one possible implementation of low pass filtering in the present invention.

As shown in FIG. 3, the maximum Doppler shift/Doppler frequency for the input signal may be determined based on the carrier frequency and maximum speed at which the mobile wireless unit is moving (300). A low pass finite impulse response filter is constructed based on the maximum Doppler frequency (305). This filter is then applied to the noisy fading data to increase the fading to noise ratio so that the fading data can be analyzed with greater accuracy (310). The filtered data is then time shifted based on the order of the filter to compensate for the lag induced by the filtering process (315). The filtered data is then output to the model construction process (320).

Figure 4:
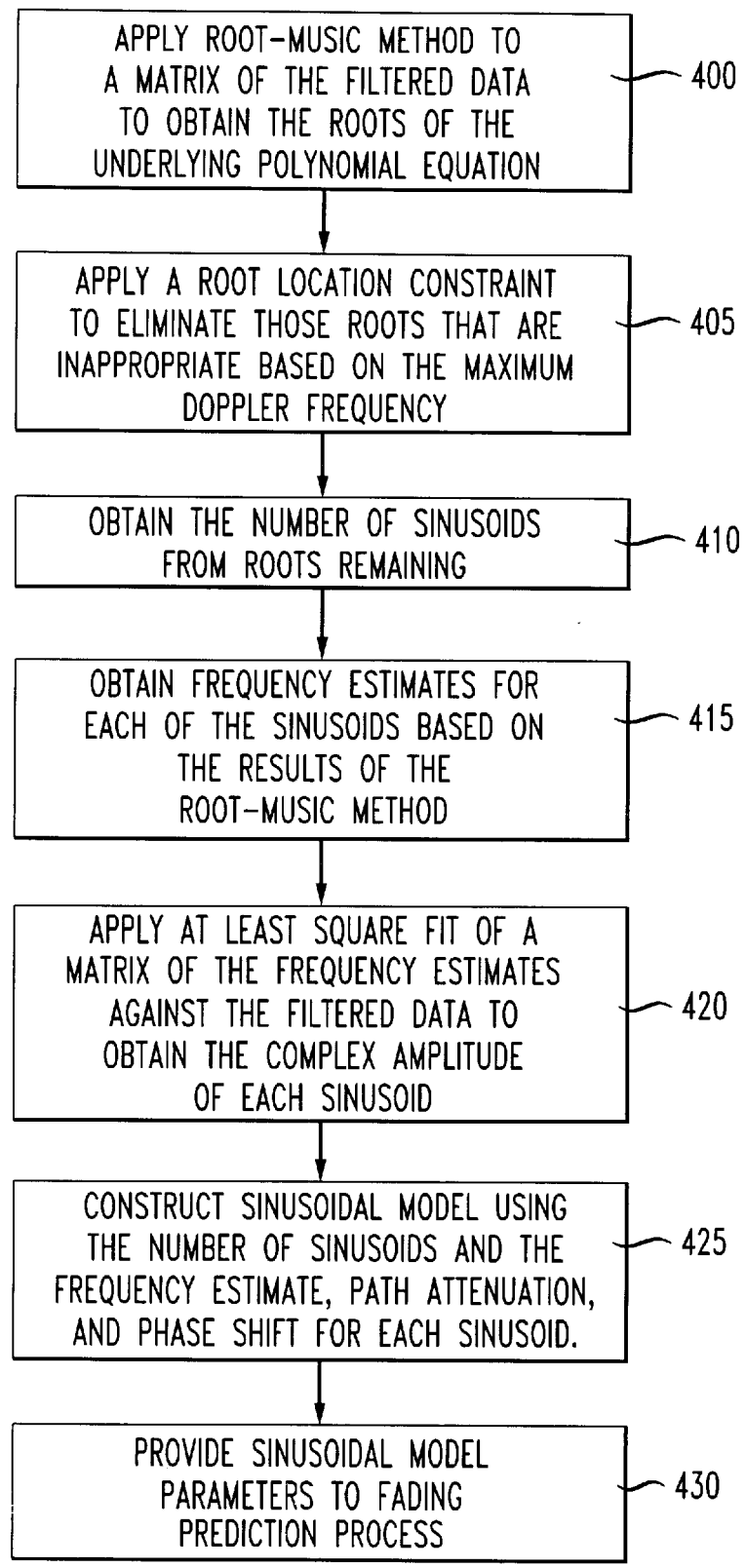
FIG. 4 is a flowchart illustrating one possible implementation of sinusoidal model construction.

The model construction process, as shown in FIG. 4, applies the root-MUSIC algorithm to a matrix of the filtered data to obtain the roots of the underlying polynomial equation that defines the fading behavior (400). A root location constraint based on the maximum Doppler frequency is then used to eliminate those roots that are inappropriate for use in the model (405). The number of sinusoids is then obtained based on the number of remaining roots (410). Based on the remaining roots a frequency estimate for each sinusoid in the model is also obtained (415). A least square fit of a matrix of the frequency estimates is then applied against the filtered data to obtain the complex amplitude (which includes the path attenuation and phase shift) for each sinusoid (420). The least square fit may also be enhanced by applying a control point restraint wherein at certain points the least square fit is forced to coincide with the fading data. The sinusoidal model is then constructed using these results, namely: the number of sinusoids and the frequency, path attenuation, and phase shift of each sinusoid (425). The parameters of this model are then passed to the fading prediction process (430).

Figure 5:
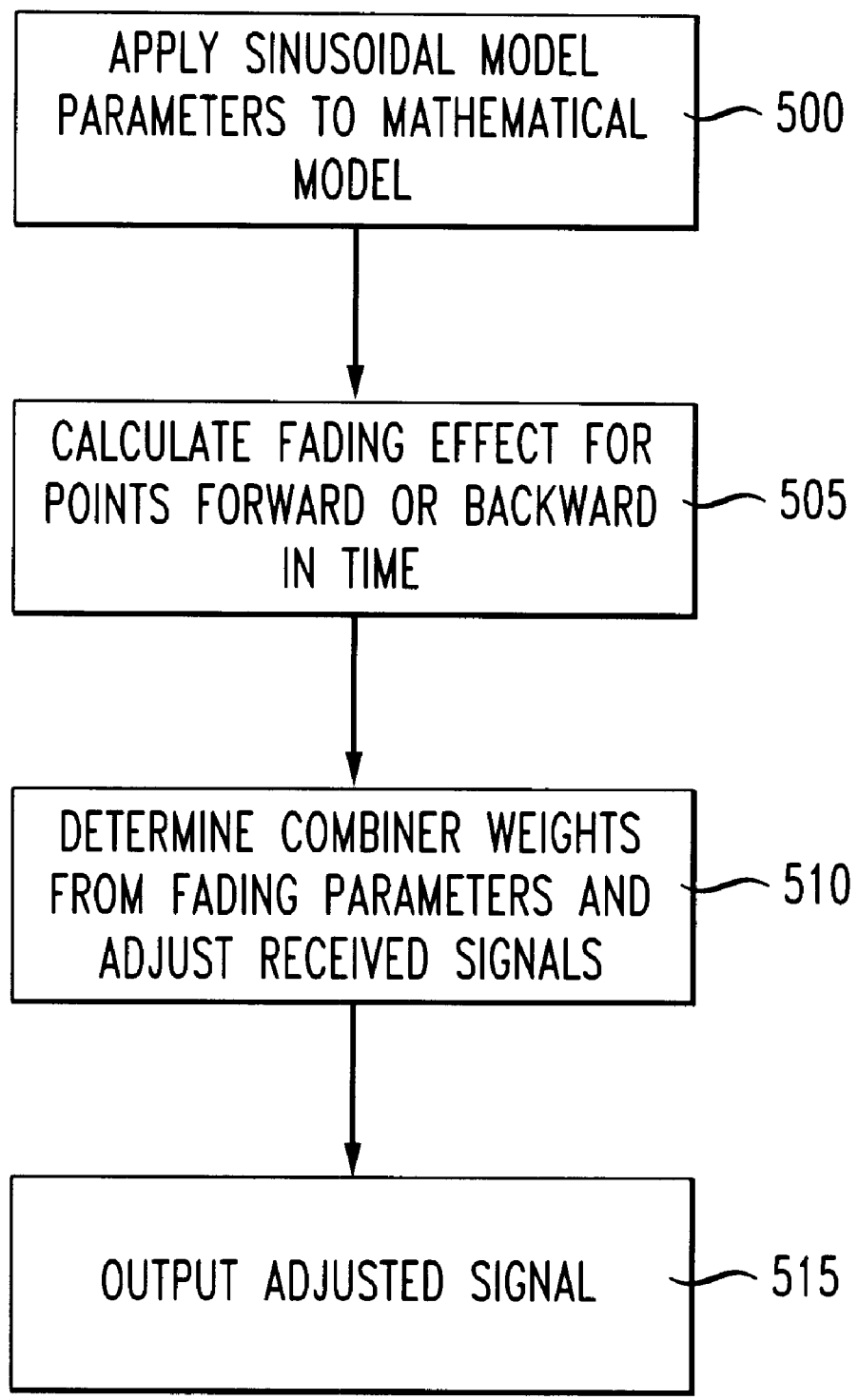
FIG. 5 is a flowchart illustrating one possible implementation of predicting fading behavior using a sinusoidal model in the present invention.

The fading prediction process, as shown in FIG. 5, applies the model parameters to the mathematical model as depicted in equation (3) above (500). The predicted fading is then calculated for discrete points either forward or backward in time from the sampled data that was used to construct the model (505). Combiner weights are then determined from the fading parameters and used to adjust the signal for the fading at the corresponding points in time (510). The adjusted signal is then output with much of the fading distortion removed (515).

Obviously the fading behavior of the incoming signal changes over time as the mobile wireless unit moves through the environment. The rate at which this fading behavior changes is heavily dependent on the environment through which the mobile unit is traveling. For example if the mobile unit is in an urban environment surrounded by office buildings the fading behavior will change much more quickly than if the mobile unit was in a rural area with few obstructions to reflect the signal. Hence the model constructed by the present invention must be periodically updated in order to compensate for the changes in the fading behavior. The necessary update frequency to maintain the effectiveness of the model can vary widely depending on the environmental factors and mobile unit speed, but once a second is likely to be sufficient in most situations without being computationally burdensome on the physical hardware in which the present invention is implemented.

The present invention as described above constructs a sinusoidal model based on the signal received at a single antenna. However, the present invention can also be used in a multiple antenna system using the model constructed from a single antenna or jointly from multiple antennas and using well known techniques to calculate the appropriate combiner weights based on the resulting model. The parameters of the model for a multiple antenna signal would consist of the sinusoids' amplitude, frequency, angle of arrival, and absolute phase for one of the antennas, and the phases of the other antennas would be calculated therefrom.

The present invention can also be used in a temporal processing technique. When the incoming signal has intersymbol interference, the model can be used to calculate the appropriate delay combiner weights for use in a linear or feedback equalizer in order to correct for the interference.

The present invention is not limited to the specific embodiments described. It is expected that those skilled in the art will be able to devise other implementations that embody the principles of the present invention and remain within its scope.

What is claimed is:

1. A method for predicting multipath fading in a received signal using a sinusoidal model, comprising:
    filtering the signal with a low pass filter to produce filtered data;
    applying a root-MUSIC algorithm to the filtered data to determine a frequency estimate for each sinusoid to be included in the model;
    performing a linear least square fit of a matrix of the frequency estimates against the filtered data to obtain the complex amplitude for each sinusoid to be included in the model;
    constructing the model by superimposing the sinusoids using the frequency estimate and complex amplitude for each sinusoid; and
    predicting multipath fading based on said sinusoidal model.

2. The method of claim 1 wherein the step of applying a root-MUSIC algorithm further comprises:
    determining the number of sinusoids in the model by using the maximum Doppler frequency as a root location constraint.

3. The method of claim 2 wherein the step of performing a least square fit further comprises:
    using a control point restraint to improve the fit of the sinusoidal model to the filtered data.

4. The method of claim 2 wherein said predicting step comprises:
    calculating values for the predicted fading effect for discrete time points outside the range of the filtered data; and
    adjusting the signal at the corresponding discrete time points using the calculated values.

5. The method of claim 2 wherein said filtering step comprises:
    constructing a finite impulse response filter related to the maximum Doppler frequency of the signal;
    applying said finite impulse response filter to said discrete-time data.

6. The method of claim 5 wherein the finite impulse response filter is a Parks-McClellan optimal equiripple filter.

7. The method of claim 4 wherein said filtering step comprises:
    constructing a finite impulse response filter related to said maximum Doppler frequency;
    applying said finite impulse response filter to said discrete-time data.

8. The method of claim 7 wherein the finite impulse response filter is a Parks-McClellan optimal equiripple filter.

9. A method for constructing a sinusoidal model for predicting multipath fading in a wireless communication network comprising:
    sampling a signal to produce discrete-time data;
    removing modulation from the discrete-time data based on the symbols in the discrete-time data to produce noisy fading data;
    filtering the noisy fading data using a low pass filter;
    applying a root-MUSIC algorithm to the filtered data to obtain a plurality of frequency estimates;
    applying a least square fit of the plurality of frequency estimates to the filtered data to obtain a complex amplitude corresponding to each frequency estimate of said plurality of frequency estimates;
    defining a plurality of sinusoids, each sinusoid defined by a frequency estimate and its corresponding complex amplitude; and
    superimposing said sinusoids of said plurality of sinusoids to form the sinusoidal model.

10. The method of claim 9 wherein the step of applying the root-MUSIC algorithm includes using a root location constraint.

11. The method of claim 10 wherein the step of applying a least square fit includes using a control point constraint.

12. The method of claim 11 wherein the low pass filter is a finite impulse response filter.

13. The method of claim 12 wherein the finite impulse response filter is constructed based on the maximum Doppler frequency of the signal.

14. The method of claim 13 wherein the finite impulse response filter is a Parks-McClellan optimal equiripple filter.

15. The method of claim 11 wherein the sinusoidal model is used to calculate combiner weights for use in a spatial diversity compensation scheme.

16. The method of claim 11 wherein the sinusoidal model is used to calculate delay values for use in a temporal processing scheme.

17. A method for compensating for multipath fading in a wireless network using multiple receiving antennas comprising:
    receiving a plurality of incoming signals on a plurality of antennas;

low pass filtering each incoming signal individually to produce a corresponding set of filtered data;

building a sinusoidal model of fading behavior for the incoming signals based on said corresponding set of filtered data;

calculating combiner weights for each incoming signal based on the corresponding sinusoidal model; and combining said incoming signals using said combiner weights;

wherein the building step comprises the following sub-steps for each incoming signal:

applying a root-MUSIC algorithm to the filtered data to determine a frequency estimate for each sinusoid to be included in the model;

performing a linear least square fit of a matrix of the frequency estimates against the filtered data to obtain the complex amplitude for each sinusoid to be included in the model; and constructing the model using the frequency estimate and complex amplitude for each sinusoid.

18. The method of claim 17 further comprising:

determining the number of sinusoids to be included in the model by using the maximum Doppler frequency as a root location constraint.

19. The method of claim 18 further comprising:

using a control point restraint to improve the fit of the sinusoidal model to the filtered data.

20. The method of claim 19 wherein the low pass filtering step uses a finite impulse response filter based on the maximum Doppler frequency of the incoming signal.

21. The method of claim 20 wherein the finite impulse response filter is a Parks-McClellan optimal equiripple filter.

22. A program storage device readable by a machine, tangibly embodying a program of executable instructions to perform a method for predicting multipath fading in a received signal using a sinusoidal model, the method comprising:

filtering the signal with a low pass filter to produce filtered data;

applying a root-MUSIC algorithm to the filtered data to determine a frequency estimate for each sinusoid to be included in the model;

performing a linear least square fit of a matrix of the frequency estimates against the filtered data to obtain the complex amplitude for each sinusoid to be included in the model;

constructing the model by superimposing the sinusoids using the frequency estimate and complex amplitude for each sinusoid; and predicting multipath fading based on said sinusoidal model.

23. A program storage device readable by a machine, tangibly embodying a program of executable instructions to perform a method for constructing a sinusoidal model for predicting multipath fading in a wireless communication network, the method comprising:

sampling a signal to produce discrete-time data;

removing modulation from the discrete-time data based on the symbols in the discrete-time data to produce noisy fading data;

filtering the noisy fading data using a low pass filter;

applying a root-MUSIC algorithm to the filtered data to obtain a plurality of frequency estimates;

applying a least square fit of the plurality of frequency estimates to the filtered data to obtain a complex amplitude corresponding to each frequency estimate of said plurality of frequency estimates;

defining a plurality of sinusoids, each sinusoid defined by a frequency estimate and its corresponding complex amplitude; and superimposing said sinusoids of said plurality of sinusoids to form the sinusoidal model.

* * * * *